US012316899B2

(12) United States Patent
Liu

(10) Patent No.: US 12,316,899 B2
(45) Date of Patent: May 27, 2025

(54) SCREEN PROJECTION

(71) Applicant: SHENZHEN TCL NEW TECHNOLOGY CO., LTD., Guangdong (CN)

(72) Inventor: Wenhua Liu, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 18 days.

(21) Appl. No.: 18/343,764

(22) Filed: Jun. 29, 2023

(65) Prior Publication Data

US 2023/0345070 A1  Oct. 26, 2023

Related U.S. Application Data

(63) Continuation of application No. PCT/CN2021/111514, filed on Aug. 9, 2021.

(30) Foreign Application Priority Data

Dec. 29, 2020  (CN) .......................... 202011610143.6

(51) Int. Cl.
*H04N 21/41* (2011.01)
*H04N 21/4363* (2011.01)

(52) U.S. Cl.
CPC ... *H04N 21/4122* (2013.01); *H04N 21/43637* (2013.01)

(58) Field of Classification Search
CPC ......... H04N 21/4122; H04N 21/43637; H04N 21/4126; H04N 21/431
See application file for complete search history.

(56) References Cited

U.S. PATENT DOCUMENTS

| 2015/0199165 A1* | 7/2015 | Chopde .............. H04N 21/4122 345/2.2 |
| 2015/0257091 A1 | 9/2015 | Zur et al. |
| 2016/0321567 A1 | 11/2016 | Sandholm et al. |

(Continued)

FOREIGN PATENT DOCUMENTS

| CN | 104780433 A | 7/2015 |
| CN | 105094732 A | 11/2015 |
| CN | 106559699 A | 4/2017 |

(Continued)

OTHER PUBLICATIONS

International Search Report in International application No. PCT/CN2021/111514, mailed on Nov. 9, 2021.

(Continued)

*Primary Examiner* — Michael R Telan
(74) *Attorney, Agent, or Firm* — PV IP PC; Wei Te Chung

(57) ABSTRACT

A screen projection method includes: receiving an identification detection request transmitted by the source device when the source device is within a preset range of the sink device; obtaining real-time proximity information of the source device according to the identification detection request; matching the real-time proximity information of the source device with the learned proximity information to obtain the comparison result; and receiving the screen projection request transmitted by the source device according to the comparison result to perform screen projection.

18 Claims, 2 Drawing Sheets

(56) References Cited

U.S. PATENT DOCUMENTS

2020/0387126 A1* 12/2020 Yum .................. G06F 1/206
2021/0274243 A1*  9/2021 Zhao ............... H04N 21/43076

FOREIGN PATENT DOCUMENTS

| CN | 108901024 A | 11/2018 |
| CN | 109243226 A | 1/2019 |
| CN | 109618220 A | 4/2019 |
| CN | 109862404 A | 6/2019 |
| CN | 110191452 A | 8/2019 |
| CN | 111061447 A | 4/2020 |
| CN | 111147938 A | 5/2020 |
| CN | 112822530 A | 5/2021 |
| JP | 2015025979 A | 2/2015 |
| JP | 2019082973 A | 5/2019 |
| WO | 2017124617 A1 | 7/2017 |

OTHER PUBLICATIONS

Written Opinion of the International Search Authority in International application No. PCT/CN2021/111514, mailed on Nov. 9, 2021.

Chinese Office Action issued in corresponding Chinese Patent Application No. 202011610143.6 dated Mar. 16, 2022, pp. 1-9.

* cited by examiner

SCREEN PROJECTION

CROSS-REFERENCE TO RELATED APPLICATIONS

This application is a continuation of International Application No. PCT/CN2021/111514, filed on Aug. 9, 2021, which claims priority to and the benefit of Chinese Patent Application No. 202011610143.6, filed on Dec. 29, 2020. The disclosures of the aforementioned applications are incorporated herein by reference in their entireties.

TECHNICAL FIELD

The present application relates to communication technologies, and more particularly, to screen projection.

BACKGROUND

Conventional wireless screen projection technologies, such as Miracast, are wireless display standards based on Wi-Fi Direct. A mobile phone may play a video or a photo directly on a television or other device via the Miracast without any connection lines. Specifically, the Miracast is started at a sink device, such as a large screen end device or a television, so that the sink device is in a discoverable state. A projection software is then opened on a source device, such as the mobile phone to search for device information of the large screen end device or the television on which screen projection needs to be performed. In response to find the device information, a connection is established between the source device and the sink device to further realize the screen projection.

SUMMARY

In a first aspect, the present application provides a screen projection method applied to a sink device, including: receiving an identification detection request transmitted by a source device, where the identification detection request is a detection request transmitted when the source device is within a preset range of the sink device; obtaining real-time proximity information of the source device according to the identification detection request; matching the real-time proximity information of the source device with learned proximity information to obtain a comparison result; and receiving a screen projection request transmitted by the source device according to the comparison result to perform screen projection.

In a second aspect, the present application provides a screen projection method applied to a source device, including: responsive to the source device being within a preset range of a sink device, transmitting an identification detection request to the sink device, and receiving an identification detection response transmitted by the sink device; obtaining real-time proximity information of the sink device according to the identification detection response; matching the real-time proximity information of the sink device with learned proximity information to obtain a comparison result; and transmitting a screen projection request to the sink device according to the comparison result to perform screen projection.

In a third aspect, the present application provides a sink device, including: a processor; and a memory stored a computer program thereon which, when executed by the processor, implements any of the screen projection methods as described in the first aspect.

In a fourth aspect, the present application provides a source device, including: a processor; and a memory stored a computer program thereon which, when executed by the processor, implements any of the screen projection methods as described in the second aspect.

In a fifth aspect, the present application provides a screen projection system, including: a sink device configured to implement any of the screen projection methods as described in the first aspect; and a source device configured to implement any of the screen projection methods as described in the second aspect.

DETAILED DESCRIPTION

Figure 1:
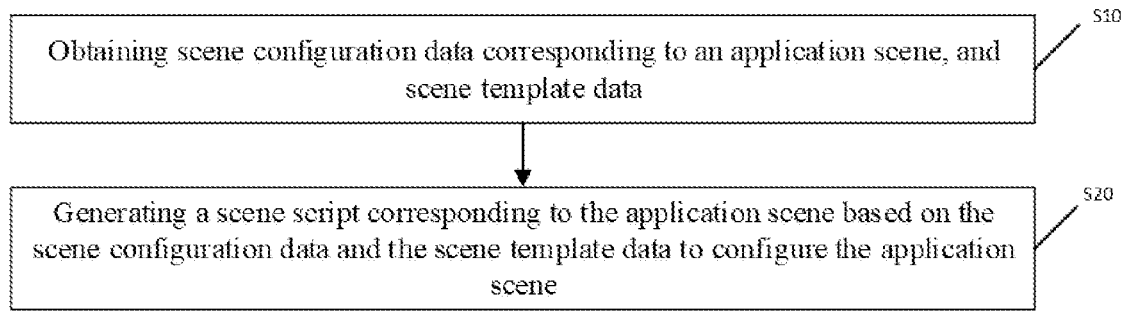
FIG. 1 is a schematic flowchart of a screen projection method according to an embodiment of the present application.

Some embodiments of the present application will be described in detail below in conjunction with the drawings. The embodiments are provided for illustrative purposes only, not intended to limit the scope of the present application.

It should be noted that all directional indications (such as up, down, left, right, front, back, etc.) in the embodiments of the present application are only intended to explain a relative positional relationship, a motion situation, and the like between components in a particular pose (as shown in the drawings), and if the particular pose changes, the directional indication changes accordingly.

In the present application, it should be noted that the terms "connection" and "fixing" should be understood in a broad sense, unless otherwise clearly specified and defined. For example, "fixing" can be a fixed connection, a detachable connection, or integrated connection; it can be a mechanical connection or an electrical connection; it can be directly connected or indirectly connected through an intermediary; it can also be the connection between two elements or the interaction between two elements, unless otherwise clearly defined. Those ordinary skilled in the art can understand the specific meanings of the above terms in the present application according to specific situations.

In addition, if terms "first", "second" or the like are involved in the embodiments of the present application, the terms are for illustrative purposes only and are not to be construed as indicating or imposing a relative importance or implicitly indicating the number of technical features indicated. Thus, a feature that limited by "first", "second" may expressly or implicitly include at least one of the features. In addition, the meaning "and/or" appearing throughout the present application includes three juxtaposed schemes. "A and/or B" is exemplified to include schemes A, or B, or both A and B. In addition, the technical solutions of the various embodiments may be combined with each other, but the combination of the technical solutions must be realized by a person of ordinary skill in the art. When the combination of the technical solutions is inconsistent with each other or cannot be realized, the combination of the technical solutions should be considered not to exist or fall within the protection scope of the present application.

In view of the technical problems of complicated process and cumbersome operations in the screen projection method in the prior art, the present application provides a screen projection method. Its general concept is illustrated as follows.

When the screen projection method is applied to a sink device, the method includes: receiving an identification detection request transmitted by a source device, where the identification detection request is a detection request transmitted when the source device is within a preset range of the sink device; obtaining real-time proximity information of the source device according to the identification detection request; matching the real-time proximity information of the source device with learned proximity information to obtain a comparison result; and receiving a screen projection request transmitted by the source device according to the comparison result to perform screen projection.

When the screen projection method is applied to a source device, the method includes: responsive to the source device being within a preset range of a sink device, transmitting an identification detection request to the sink device, and receiving an identification detection response transmitted by the sink device; obtaining real-time proximity information of the sink device according to the identification detection response; matching the real-time proximity information of the sink device with learned proximity information to obtain a comparison result; and transmitting a screen projection request to the sink device according to the comparison result to perform screen projection.

With the above technical solutions, when the source device is close to the sink device, the real-time proximity information of the source device can be obtained by receiving the identification detection request transmitted by the source device. The real-time proximity information of the source device can be then matched with the learned proximity information to obtain the comparison result. Finally, the screen projection request transmitted by the source device can be received according to the comparison result to perform screen projection. The present application does not need to add or change an additional hardware. By preferentially learning a proximity behavior between the source device and the sink device, the learned proximity information can be obtained and stored. When the source device is close to the sink device again, the obtained real-time proximity information is compared with the learned proximity information, so that the proximity behavior of the source device and the sink device can be mutually identified. When both the source device and the sink device are successfully identified, an application scenario such the screen projection display or the WIFI connection can be triggered. The present application greatly simplifies operation steps of the projection screen and improves the experience of the user in implementing the projection screen.

A First Embodiment

Referring to FIG. 1, the first embodiment of the present application provides a screen projection method applied to a sink device. The sink device and a source device can be recognizable to each other, but no connection is established therebetween. The screen projection method may be applied to a screen projection display scenario. For example, the screen projection method may be applied to a screen projection display scenario in which a mobile phone is used as a source device and a television is used as a sink device, or may be applied to a WIFI connection scenario in which a mobile phone is used as a source device and a router is used as a sink device.

With reference to FIG. 1, the screen projection method provided in the present embodiment is described in detail below. The method specifically includes the following steps.

At step S101, an identification detection request transmitted by a source device may be received, where the identification detection request may be a detection request transmitted when the source device is within a preset range of the sink device.

Specifically, the identification detection request includes a first signal strength value of the source device and a first proximity information element of the source device. When the source device is close to the sink device and located within a signal receiving range preset by the sink device, the source device continuously transmits an identification detection request, and the sink device continuously receives the identification detection request. Meanwhile, the sink device continuously transmits an identification detection response, and correspondingly, the source device continuously receives the identification detection response. The identification detection request and the identification detection response are both provided with proximity information elements.

In a specific implementation, interaction between the source and the sink is performed by a management frame of IEEE 802.11, for example, interaction operations that the sink device receives the identification detection request transmitted by the source device and the sink transmitting the identification detection response to the source device. This process can perform information interaction without connection to the WIFI. A process of verifying a password of the WIFI can be eliminated, and the screen projection operation can be further simplified.

Specifically, the IEEE 802.11 is a standard commonly used in a current wireless local area network. A management process of the management frame of the IEEE 802.11 may be divided into following three steps: firstly, a mobile workstation finds an accessible and compatible wireless network; secondly, a network system verifies the mobile workstation; and finally, an association is established between the mobile workstation and a wireless access point. A body of the frame has fixed fields (fixed-length fields) and information elements (variable-length data blocks).

In a specific implementation, a proximity information element (IE) (such as, a nearby IE) may be a vendor-defined private protocol (such as, a Vendor IE), where the Information Element represents an information factor and is an integral part of an information system.

In the present embodiment, when the mobile phone is close to the television, the television may receive the identification detection request transmitted by the mobile phone, and then transmit the identification detection response to the mobile phone. Alternatively, the mobile phone may receive the identification detection response transmitted by the television, and then transmit the identification detection request, so as to prevent the mobile phone from transmitting the identification detection request at any time and occupying too much memory.

At step S102, real-time proximity information of the source device may be obtained according to the identification detection request.

In some embodiments, the identification detection request includes a first signal strength value of the source device, and the real-time proximity information of the source device includes a first proximity signal strength value of the source device relative to the sink device and a first Media Access Control (MAC) address of the source device.

In a specific implementation, the obtaining of the real-time proximity information of the source device according to the identification detection request can be specifically implemented by steps S102.1-102.4.

At step S102.1, an MAC address added when the identification detection request is packed by the source device is obtained according to the identification detection request as the first MAC address of the source device.

Specifically, the MAC address added when the identification detection request is packed by the source device may be obtained from the identification detection request as the first MAC address of the source device.

At step S102.2, a plurality of first signal strength values are obtained according to received history identification detection requests to calculate an average value of the plurality of first signal strength values.

Specifically, since identification detection request transmitted by the source device are continuously received, a plurality of identification detection requests may have been received. According to the number of antennas of the source device, there may be one signal strength value or two signal strength values in one of the identification detection requests. When there are two signal strength values in the one identification detection request, the maximum signal strength value is selected from the signal strength values as the first signal strength value of the identification detection request. A plurality of first signal strength values can be respectively selected from the plurality of identification detection requests to calculate an average value of the first signal strength values.

In the present embodiment, it is assumed that the television has received 10 identification detection requests continuously transmitted by the mobile phone and a dual antenna is used in the mobile phone, two signal strength values can be read from each of the identification detection requests, and only a maximum value $RSSI_{max}$ is selected from each of the identification detection requests. As such, 10 first signal strength values RSSI ($RSSI_{max1}$, $RSSI_{max2}$, ... $RSSI_{max10}$) can be read from the 10 identification detection requests to calculate an average value of the 10 RSSI values, $RSSI_{MAX}=(RSSI_{max1}+RSSI_{max2}+ \ldots +RSSI_{max10})/10$. Therefore, the average value, $RSSI_{MAX}$ may be the average value of the plurality of first signal strength values to be obtained in the step S102.2.

At S102.3, a range of the signal strength values may be obtained according to the average value of the step S102.2.

Specifically, the range of the signal strength values may be set according to the average value of the plurality of first signal strength values obtained in the step S102.2 in an actual condition. For example, the range may be set in a range of 0.9 to 1.1 times the average value.

In the present embodiment, the 10 RSSI values are set according to the average value $RSSI_{MAX}$ obtained in the step S102.2 to satisfy $RSSI_{MAX}$ (1-10%)≤$RSSI_{max}$≤$RSSI_{MAX}$ (1+10%).

At step S102.4, an average value of first signal strength values among the plurality of first signal strength values in the range as a first proximity signal strength value of the source device relative to the sink device.

Specifically, in order to remove signal strength values that may fluctuate greatly and thus affect calculation of the average value, a first signal strength value that exceeds the range of the signal strength values in the step S102.3 may be directly discarded, and the remaining of the signal strength values may be averaged again, so that the first proximity signal strength value can be accurately obtained.

In the present embodiment, it is sequentially confirmed whether the 10 first signal strength values RSSI ($RSSI_{max1}$, $RSSI_{max2}$, ... $RSSI_{max10}$) are within the range set in the step S102.3. Assuming that the $RSSI_{max1}$ is not within the range, the $RSSI_{max1}$ is directly discarded, and the remaining ($RSSI_{max2}$, ... $RSSI_{max10}$) of the signal strength values RSSI can be averaged to obtain an average value of the signal strength values, $RSSI_{AV}=(RSSI_{max2}+RSSI_{max3}+ \ldots +RSSI_{max10})/9$. The obtained average value, $RSSI_{AV}$, is a first proximity signal strength value of the mobile phone relative to the television.

In another implementation, the identification detection request further includes a first proximity information element of the source device.

The method may further include, after the receiving of the identification detection request transmitted by the source device: A102.1 of transmitting an identification detection response to the source device; A102.2 of determining, according to the first proximity information element, whether the received identification detection request is marked; and A102.3 of, responsive to the received identification detection request being marked, stopping transmission of the identification detection response to the source device.

Specifically, when a bit defined in the first proximity information element in the received identification detection request is marked, that is, the bit is 1, it is indicated that the source device has identified the sink device to determine the proximity behavior between the sink device and the source device. Therefore, the sink device does not need to transmit an identification detection response to the source device.

At step S103, the real-time proximity information of the source device may be matched with learned proximity information to obtain a comparison result.

Specifically, the learned proximity information stored in the sink device includes a second proximity signal strength value of the source device relative to the sink device and a second Media Access Control (MAC) address of the source device.

In a specific implementation, the matching of the real-time proximity information of the source device with the learned proximity information to obtain the comparison result can be implemented by: S103.1 of determining whether the first proximity signal strength value is greater than the second proximity signal strength value and whether the first MAC address is consistent with the second MAC address; S103.2 of, responsive to the first proximity signal strength value being greater than the second proximity signal strength value and the first MAC address being consistent with the second MAC address, determining that the real-time proximity information of the source device matches the learned proximity information; and S103.3 of, responsive to the first proximity signal strength value being not greater than the second proximity signal strength value or the first MAC address being inconsistent with the second MAC address, determining that the real-time proximity information of the source device does not match the learned proximity information.

Specifically, the sink device and the source device preferentially learned a proximity behavior, and a second proximity signal strength value of the source device relative to the sink device and a second MAC address of the source device can be stored as the learned proximity information stored in the sink device. In an actual proximity identification process, if the obtained first MAC address of the source device is consistent with the stored second MAC address of the source device, it is indicated that the source device is a source device that has learned the proximity behavior with the sink device. Meanwhile, if the obtained first proximity signal strength value of the source device relative to the sink device is greater than the second proximity signal strength value of the source device relative to the sink device, it is indicated that a distance between the source device and the sink device at this time is less than a distance between the source device and the sink device in the previous learning proximity process. That is, it can be determined that the proximity behavior of the source device close to the sink device is satisfied.

In the present embodiment, if the obtained first MAC address of the mobile phone is in the list of MAC addresses already stored on the television, the first MAC address of the mobile phone is consistent with the second MAC address already stored on the television. Meanwhile, if the second proximity information strength value of the mobile phone relative to the television is consistent with the first proximity information strength value already stored on the television, it is indicated that the mobile phone is close to the television. That is, it can be determined that the proximity behavior of the mobile phone close to the television is satisfied.

At step S104, a screen projection request transmitted by the source device may be received according to the comparison result to perform screen projection.

In a specific implementation, the receiving of a screen projection request transmitted by the source device according to the comparison result to perform screen projection can be implemented by steps S104.1-S104.2.

At S104.1: an identification detection response may be marked responsive to the real-time proximity information matching the learned proximity information and the screen projection request transmitted by the source device may be received to perform screen projection.

Specifically, when the real-time proximity information of the source device matches the learned proximity information, it is determined that the proximity behavior between the source device and the sink device is established, that is, the sink device identifies the proximity behavior of the source device successfully. In this case, the sink device does not need to receive the identification detection request transmitted by the source device, and thus the identification detection response transmitted from the sink device to the source device may be marked. Specifically, a bit defined in a third proximity information element of the identification detection response is marked, and the bit is marked to be equal to 1. When the source device receives an identification detection response and identifies that it is marked, the transmission of the identification detection request to the sink device may be stopped. Meanwhile, if the source device also determines that the proximity behavior of the sink device is satisfied, a screen projection request can be transmitted from the source device. After the screen projection request is received by the sink device, the sink device notifies an application layer to establish a connection for screen projection between the sink device and the source device, so that the screen projection can be performed.

At step S104.2, receiving of an identification detection request transmitted by the source device is stopped responsive to the real-time proximity information not matching the learned proximity information.

Specifically, when the real-time proximity information does not match the learned proximity information, it is indicated that the source device may not have learned the proximity behavior with the sink device. The screen projection cannot be performed according to the proximity behavior, so the sink device no longer receives the identification detection request transmitted by the source device.

With reference to the foregoing embodiments, in a further technical solution, a learning process in which a source device is close to a sink device is further provided, which may be specifically implemented by following steps.

At step X101: a learning detection request transmitted by a source device may be received, where the learning detection request may be a detection request transmitted when the source device is within a preset range of the sink device.

Specifically, the learning detection request transmitted by the source device may be received, and a learning detection response may be transmitted to the source device, where the learning detection request includes a second signal strength value of the source device and a second proximity information element of the source device. When the source device is close to the sink device and located within a signal receiving range preset by the sink device, the source device continuously transmits a learning detection request, and the sink device continuously receives the learning detection request. Meanwhile, the sink device continuously transmits a learning detection response to the source device, and correspondingly, the source device continuously receives the learning detection response. The learning detection request and the learning detection response are both provided with proximity information elements. When a new source device and the sink device perform proximity learning, the sink device does not store learned proximity information of the source device, so that it can be distinguished that a received detection request is a learning detection request and not an identification detection request.

At step X102, the learned proximity information of the source device may be obtained and stored according to the learning detection request.

Specifically, the learning detection request includes a second signal strength value of the source device, and the learned proximity information of the source device includes a second proximity signal strength value of the source device relative to the sink device and a second MAC address of the source device.

Specifically, obtaining and storing the learned proximity information of the source device according to the learning detection request can be implemented by steps X102.1-X102.4.

At step X102.1, an MAC address added when the learning detection request is packed by the source device may be obtained according to the learning detection request as the second MAC address of the source device.

Specifically, the MAC address added when the learning detection request is packed by the source device may be obtained from the learning detection request as the obtained second MAC address of the source device.

At step X102.2, a plurality of second signal strength values may be obtained from received history learning detection requests to calculate an average value of the plurality of second signal strength values.

At step X102.3, a range of the signal strength values may be set according to the average value of the step X102.2.

At step X102.4, an average value of second signal strength values among the plurality of second signal strength values in the range may be obtained as a second proximity signal strength value of the source device relative to the sink device.

It should be noted that a detailed process of calculating the second proximity signal strength value of the source device relative to the sink device in the steps X102.2-X102.4 is similar to that of calculating the first proximity signal strength value of the source device relative to the sink device in the steps S102.2-S102.4, and is not repeatedly described herein for the sake of brevity of the description.

At step X102.5, the learned proximity information of the source device may be stored.

Specifically, the second proximity signal strength value of the source device relative to the sink device and a second MAC address of the source device may be stored. For example, the second MAC address may be stored in a learning list of MAC addresses of the sink device for calling and comparison when the proximity behavior of the source device is subsequently identified.

In another implementation, after the obtaining and storing learned proximity information of the source device according to the learning detection request, the method may further includes following steps X103-X105.

At step X103, the learning detection response may be marked.

Specifically, after the learned proximity information of the source device is stored, the sink device does not need to receive the learning detection request transmitted by the source device, and thus the learning detection response transmitted from the sink device to the source device may be marked. Specifically, a bit defined in the first proximity information element of the learning detection response is marked, and the bit is marked to be equal to 1. When the source device receives a learning detection response and identifies that it is marked, the transmission of the learning detection request may be stopped.

At step X104, whether the received learning detection request is marked can be determined according to the second proximity information element.

Specifically, whether the received learning detection request is marked can be determined according to the second proximity information element while the learned proximity information of the source device may be obtained and stored according to the learning detection request.

At step X105, transmission of the learning detection response to the source device may be stopped responsive to the received learning detection request being marked.

Specifically, when a bit defined in the second proximity information element in the received learning detection request is marked, that is, the bit is 1, it is indicated that the source device has learned the proximity behavior with the sink device. Therefore, the sink device does not need to transmit a learning detection response to the source device, and transmission of the learning detection response to the source device may be stopped. When the source device stops transmitting the learning detection request to the sink device and the sink device also stops transmitting the learning detection response to the source device, the learning proximity behavior of the source device close to the sink device may be ended. When the source device is subsequently close to the sink device again, identification of the learning proximity behavior can be implemented according to the steps S101-S104.

The present embodiment provides the screen projection method applied to the sink device. When the source device is close to the sink device, the real-time proximity information of the source device can be obtained by receiving the identification detection request transmitted by the source device. The real-time proximity information of the source device can be then matched with the learned proximity information to obtain the comparison result. Finally, the screen projection request transmitted by the source device can be received according to the comparison result to perform screen projection. The present application does not need to add or change an additional hardware. By preferentially learning a proximity behavior between the source device and the sink device, the learned proximity information can be obtained and stored. When the source device is close to the sink device again, the obtained real-time proximity information is compared with the learned proximity information, so that the proximity behavior of the source device and the sink device can be mutually identified. When both the source device and the sink device are successfully identified, an application scenario such the screen projection display or the WIFI connection can be triggered. The present application greatly simplifies operation steps of the projection screen and improves the experience of the user in implementing the projection screen. When a user wants to perform screen projection from the mobile phone to the television, the mobile phone is close to the television, and the screen projection can be directly triggered by the proximity identification between the mobile phone and the television, so that the screen projection display or the WIFI connection can be implemented without changing the hardware or adding the near field communication equipment.

A Second Embodiment

Figure 2:
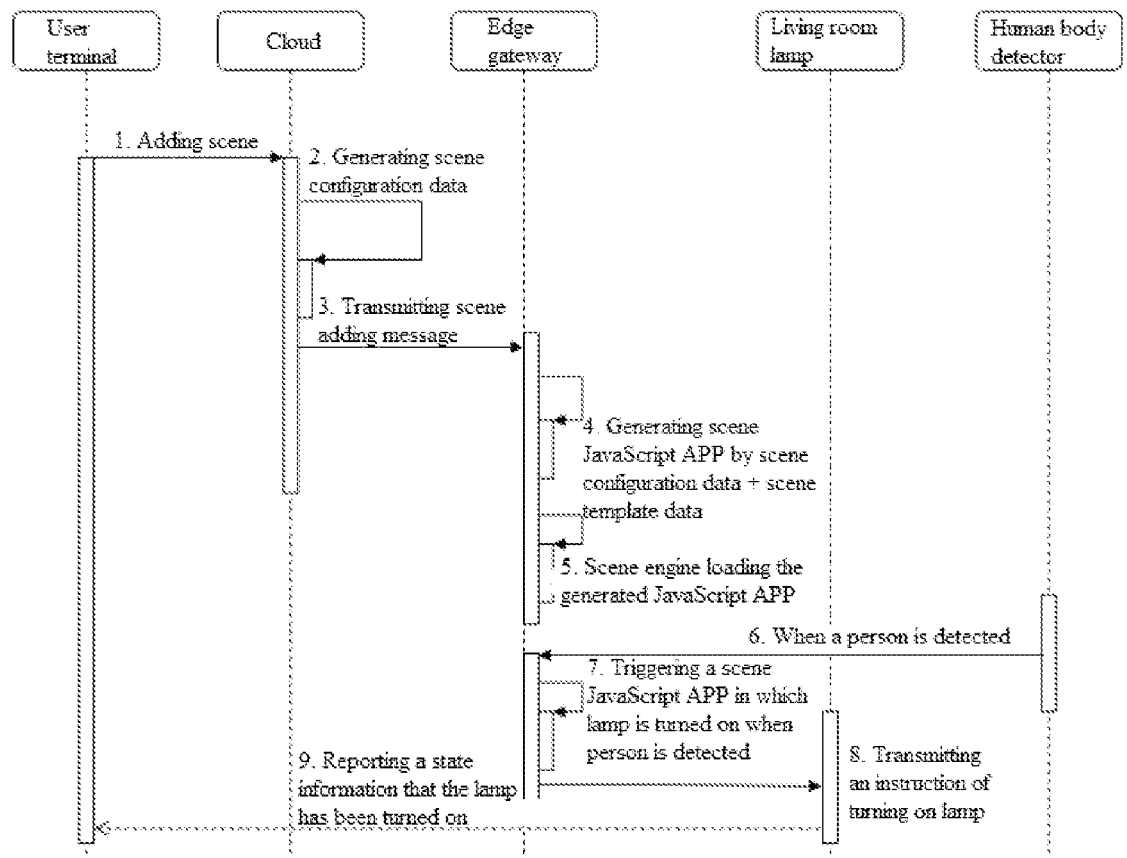
FIG. 2 is a schematic flowchart of a screen projection method according to another embodiment of the present application.

Referring to FIG. 2, the second embodiment of the present application provides a screen projection method applied to a source device based on the same application concept. The screen projection method provided in the present embodiment may be described in detail based on the first embodiment of the present application. The method may specifically include following steps.

At S201, responsive to the source device being within a preset range of a sink device, an identification detection request to the sink device may be transmitted, and an identification detection response transmitted by the sink device may be received.

Specifically, the identification detection response may include a third signal strength value of the sink device and a third proximity information element of the sink device. When the source device is close to the sink device and located within a signal receiving range preset by the sink device, the source device continuously transmits an identification detection request and receives the identification detection response transmitted by the sink device.

At step S202, real-time proximity information of the sink device may be obtained according to the identification detection response.

In some embodiments, the identification detection response may include a third signal strength value of the sink device, and the real-time proximity information of the sink device includes a third proximity signal strength value of the sink device relative to the source device and a third MAC address of the sink device.

In a specific implementation, the obtaining the real-time proximity information of the sink device according to the identification detection response can be implemented by following steps S202.1-S202.4.

At step S202.1, an MAC address added when the identification detection response is packed by the sink device may be obtained according to the identification detection response as a third MAC address of the sink device.

Specifically, an MAC address added when the identification detection response is packed by the sink device may be obtained from the identification detection response as the obtained third MAC address of the sink device.

At step S202.2, a plurality of third signal strength values may be obtained from received history identification detection responses to calculate an average value of the plurality of third signal strength values.

At step S202.3, a range of the signal strength values may be set according to the average value of the step S202.2.

At step S202.4, an average value of third signal strength values among the plurality of third signal strength values in the range may be obtained as a third proximity signal strength value of the sink device relative to the source device.

It should be noted that a detailed process of calculating the third proximity signal strength value of the sink device relative to the source device in the steps S202.2-S202.4 is similar to that of calculating the first proximity signal strength value of the source device relative to the sink device in the steps S102.2-S102.4, and is not repeatedly described herein for the sake of brevity of the description.

In another implementation, the identification detection response may further include a third proximity information element of the sink device.

After the step, responsive to the source device being within the preset range of the sink device, transmitting the identification detection request to the sink device and receiving the identification detection response transmitted by the sink device, the method may further include: step A202.1 of determining, according to the third proximity information element, whether the received identification detection response is marked; and step A202.2 of, responsive to the received identification detection response being marked, stopping transmission of the identification detection request to the sink device.

Specifically, when a bit defined in the third proximity information element in the received identification detection response is marked, that is, the bit is 1, it is indicated that the sink device has identified the source device. Therefore, the source device does not need to transmit an identification detection request.

At step S203, the real-time proximity information of the sink device may be matched with learned proximity information to obtain a comparison result.

Specifically, the learned proximity information stored in the source device includes a fourth proximity signal strength value of the sink device relative to the source device and a fourth MAC address of the sink device.

In a specific implementation, the matching of the real-time proximity information of the sink device with the learned proximity information to obtain the comparison result can be specifically implemented by: step S203.1 of determining whether the third proximity signal strength value is greater than the fourth proximity signal strength value and whether the third MAC address is consistent with the fourth MAC address; step S203.2 of, responsive to the third proximity signal strength value being greater than the fourth proximity signal strength value and the third MAC address being consistent with the fourth MAC address, determining that the real-time proximity information of the sink device matches the learned proximity information; and step S203.3 of, responsive to the third proximity signal strength value being not greater than the fourth proximity signal strength value or the third MAC address being inconsistent with the fourth MAC address, determining that the real-time proximity information of the sink device does not match the learned proximity information.

Specifically, the source device preferentially learned a proximity behavior of the sink device relative to the source device, and the fourth proximity signal strength value of the sink device relative to the source device and the fourth MAC address of the source device can be stored as the learned proximity information stored in the source device. In an actual proximity identification process, if the obtained third MAC address of the sink device is consistent with the fourth MAC address of the sink device, it is indicated that the sink device is a sink device that has learned the proximity behavior with the source device. Meanwhile, if the obtained third proximity signal strength value of the sink device relative to the source device is greater than the fourth proximity signal strength value of the sink device relative to the source device, it is indicated that a distance between the source device and the sink device is less than a distance between the source device and the sink device in the previous learning proximity process. That is, it can be determined that the proximity behavior of the sink device close to the source device is satisfied.

At step S204, a screen projection request may be transmitted to the sink device according to the comparison result to perform screen projection.

In a specific implementation, the screen projection request may be transmitted to the sink device according to the comparison result to perform screen projection can be specifically implemented by steps S204.1-S204.2.

At step S204.1, receiving of an identification detection response may be continued responsive to the real-time proximity information matching the learned proximity information.

Specifically, in order to avoid only temporary proximity between the source device and the sink device, when the currently obtained real-time proximity information of the sink device matches the learned proximity information of the source device, it is not urgent to establish a connection between the source device and the sink device.

At step S204.2, responsive to the number of received identification detection responses reaching a preset number, an identification detection request may be marked, and a screen projection request may be transmitted to the sink device to perform screen projection.

Specifically, when the real-time proximity information of the sink device continuously obtained from the plurality of identification detection response by the source device matches the learned proximity information stored in the source device and the number of matching reaches a preset number of times, it can be determined that the proximity behavior between the sink device and the source device is established, that is, the source device identifies the proximity behavior of the sink device successfully. In this case, the source device does not need to receive the identification detection request transmitted by the sink device, and thus the identification detection response transmitted from the source device to the sink device may be marked. Specifically, a bit defined in a first proximity information element of the identification detection request may be marked, and the bit is marked to be equal to 1. When the source device receives an identification detection request and identifies that it is marked, the transmission of the identification detection response may be stopped. Meanwhile, the source device may notify an application layer of generating a screen projection request and transmit the screen projection request to the sink device, so that the sink device may establish a screen projection connection after receiving the screen projection request to perform screen projection.

At step S204.3, responsive to the real-time proximity information not matching the learned proximity information, receiving of an identification detection response transmitted by the sink device may be stopped.

Specifically, when the real-time proximity information does not match the learned proximity information, it is indicated that the source device may not have learned the proximity behavior with the sink device previously. The screen projection cannot be performed according to the proximity behavior, so the source device no longer receives the identification detection response transmitted by the sink device.

With reference to the foregoing embodiments, in a further technical solution, a learning process in which a sink device is close to a source device is further provided, which may be specifically implemented by following steps.

At step X201, responsive to the source device being within a preset range of the sink device, a learning detection request may be transmitted to the sink device, and a learning detection response transmitted by the sink device may be received.

Specifically, the learning detection response includes a third signal strength value of the sink device and a fourth proximity information element of the sink device. When the source device is close to the sink device and located within a signal receiving range preset by the sink device, the source device continuously transmits a learning detection request and continuously receives a learning detection response.

At step X202, the learned proximity information of the sink device may be obtained and stored according to the learning detection response.

Specifically, the learning detection response may include a third signal strength value of the sink device, and the learned proximity information of the sink device may include a fourth proximity signal strength value of the sink device relative to the source device and a fourth MAC address of the sink device.

Specifically, the obtaining and storing the learned proximity information of the sink device according to the learning detection response can be implemented by steps X202.1-X202.4.

At step X202.1, an MAC address added when the learning detection response is packed by the sink device may be obtained according to the learning detection response as the fourth MAC address of the sink device.

Specifically, the MAC address added when the learning detection response is packed by the sink device may be obtained from the learning detection response as the obtained fourth MAC address of the sink device.

At step X202.2, a plurality of third signal strength values may be obtained from received history learning detection responses to calculate an average value of the plurality of third signal strength values.

At step X202.3, a range of the signal strength values may be set according to the average value of the step X202.2.

At step X202.4, an average value of third signal strength values among the plurality of third signal strength values in the range may be obtained as a fourth proximity signal strength value of the sink device relative to the source device.

It should be noted that a detailed process of calculating the fourth proximity signal strength value of the sink device relative to the source device in the steps X202.2-X202.4 is similar to that of calculating the first proximity signal strength value of the source device relative to the sink device in the steps S102.2-S102.4, and is not repeatedly described herein for the sake of brevity of the description.

At step X202.5, the learned proximity information of the sink device may be stored.

Specifically, the fourth proximity signal strength value of the sink device relative to the source device and a fourth MAC address of the sink device may be stored for calling and comparison when the proximity behavior of the sink device is subsequently identified.

In another implementation, after the obtaining and storing learned proximity information of the sink device according to the learning detection response, the method may further includes following steps X203-X205.

At step X203, the learning detection request may be marked.

Specifically, after the learned proximity information of the sink device is stored, the source device does not need to receive the learning detection response of the sink device, and thus the learning detection request transmitted to the sink device may be marked. When the sink device receives a learning detection request and identifies that it is marked, the transmission of the learning detection response may be stopped.

At step X204, whether the received learning detection response is marked can be determined according to the fourth proximity information element.

Specifically, whether the received learning detection response is marked can be determined according to the fourth proximity information element while the learned proximity information of the sink device may be obtained and stored according to the learning detection response.

At step X205, transmission of the learning detection request to the sink device may be stopped responsive to the received learning detection response being marked.

Specifically, when the received learning detection response is marked, it is indicated that the sink device has learned the proximity behavior with the source device. Therefore, the source device does not need to transmit a learning detection request to the sink device, and transmission of the learning detection request to the sink device may be stopped. When the sink device stops transmitting the learning detection response to the source device and the source device also stops transmitting the learning detection request to the sink device, the learning proximity behavior of the source device close to the sink device may be ended. When the source device is subsequently close to the sink device again, identification of the learning proximity behavior can be implemented according to the steps S201-S204.

The present embodiment provides the screen projection method applied to the source device. When the source device is close to the sink device, the real-time proximity information of the sink device can be obtained by receiving the identification detection response transmitted by the sink device. The real-time proximity information of the sink device can be then matched with the learned proximity information to obtain the comparison result. Finally, the screen projection request can be transmitted to the sink device according to the comparison result to perform screen projection. When a user wants to perform screen projection from the mobile phone to the television, the mobile phone is directly close to the television, and the screen projection can be directly triggered by the proximity identification between the mobile phone and the television, so that the screen projection display or the WIFI connection can be implemented without changing the hardware or adding the near field communication equipment.

A Third Embodiment

Based on the same application concept, the present embodiment provides a sink device, which may be an electronic device such as a mobile phone or a tablet computer and include: a processor; and a memory stored a computer program thereon which, when executed by the processor, implements any of the screen projection methods as described in the first embodiment.

It should be understood that the sink device may also include a multimedia component, an input/output (I/O) interface, and a communication component.

The processor may be configured to perform all or part of the steps in any of the screen projection methods as described in the first embodiment. The memory may be configured to store various types of data, which may include, for example, instructions of any of applications or methods in the electronic device, as well as application-related data.

The processor may be an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic component implementation for performing all or part of the steps in any of the screen projection methods as described in the first embodiment.

The memory may be implemented by any type of volatile or non-volatile storage device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or optical disk.

The multimedia component may include a screen, which may be a touch screen, and an audio component for outputting and/or inputting an audio signal. For example, the audio assembly may include a microphone for receiving an external audio signal. The received audio signal may be further stored in the memory or transmitted by the communication component. The audio assembly further includes at least one speaker for outputting the audio signal.

The I/O interface provides an interface between the processor and other interface modules, which may be a keyboard, a mouse, a button, etc. The button may be a virtual button or a physical button.

The communication component may be configured for wired or wireless communication between the electronic device and other devices. The wireless communication may be, for example, Wi-Fi, Bluetooth, Near Field Communication (NFC), 2G, 3G, or 4G, or a combination of one or more thereof, and correspondingly, the communication component may include a Wi-Fi module, a Bluetooth module, or an NFC module.

A Fourth Embodiment

Based on the same application concept, the present embodiment provides a source device, which may be an electronic device such as a television or a computer and include: a processor; and a memory stored a computer program thereon which, when executed by the processor, implements any of the screen projection methods as described in the second embodiment.

It should be understood that the electronic device may also include a multimedia component, an input/output (I/O) interface, and a communication component.

The processor may be configured to perform all or part of the steps in any of the screen projection methods as described in the second embodiment. The memory may be configured to store various types of data, which may include, for example, instructions of any of applications or methods in the electronic device, as well as application-related data.

The processor may be an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic component implementation for performing all or part of the steps in any of the screen projection methods as described in the second embodiment.

The memory may be implemented by any type of volatile or non-volatile storage device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or optical disk.

The multimedia component may include a screen, which may be a touch screen, and an audio component for outputting and/or inputting an audio signal. For example, the audio assembly may include a microphone for receiving an external audio signal. The received audio signal may be further stored in the memory or transmitted by the communication component. The audio assembly further includes at least one speaker for outputting the audio signal.

The I/O interface provides an interface between the processor and other interface modules, which may be a keyboard, a mouse, a button, etc. The button may be a virtual button or a physical button.

The communication component may be configured for wired or wireless communication between the electronic device and other devices. The wireless communication may be, for example, Wi-Fi, Bluetooth, Near Field Communication (NFC), 2G, 3G, or 4G, or a combination of one or more thereof, and correspondingly, the communication component may include a Wi-Fi module, a Bluetooth module, or an NFC module.

A Fifth Embodiment

Figure 3:
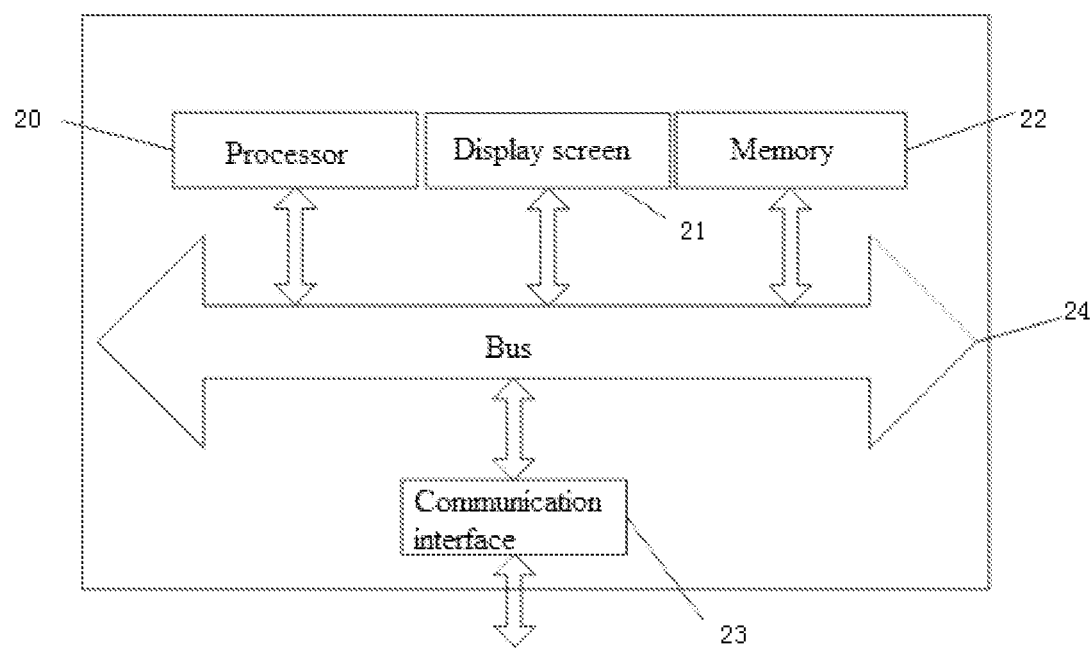
FIG. 3 is a block diagram of a screen projection system according to an embodiment of the present application.

Based on the same application concept, referring to FIG. 3, the present embodiment provides a screen projection system, including: a sink device configured to implement all of part of steps in any of the screen projection methods as described in the first embodiment; and a source device configured to implement all of part of steps in any of the screen projection methods as described in the second embodiment.

When the source device is close to the sink device, the real-time proximity information of the sink device can be obtained by the source device by receiving the identification detection response transmitted by the sink device. The real-time proximity information of the sink device can be then matched with the learned proximity information to obtain the comparison result. Finally, the screen projection request can be transmitted to the sink device according to the comparison result to perform screen projection. Meanwhile, the real-time proximity information of the source device can be obtained by the sink device by receiving the identification detection request transmitted by the source device. The real-time proximity information of the source device can be then matched with the learned proximity information to obtain the comparison result. Finally, the screen projection request transmitted by the sink device can be received according to the comparison result to perform screen projection.

In the present application, no additional hardware needs to be added or modified, so that, when the source device is close to the sink device, the application scenario such as the screen projection display or the WIFI connection can be triggered by mutual identification of the proximity behavior between the source device and the sink device. The present application greatly simplifies operation steps of the projection screen and improves the experience of the user in implementing the projection screen. When a user wants to perform screen projection from the mobile phone to the television, the mobile phone is directly close to the television, and the screen projection can be directly triggered by the proximity identification between the mobile phone and the television, so that the screen projection display or the WIFI connection can be implemented without changing the hardware or adding the near field communication equipment.

Some embodiments of the present application have been described above, but not intended to limit the scope of the present application. Various modifications or equivalent substitutions that may occur to those skilled in the art based on the teachings of the present application shall fall within the scope of the present application.

What is claimed is:

1. A screen projection method applied to a sink device, comprising:
   receiving an identification detection request from a source device within a preset range of the sink device;
   obtaining real-time proximity information for the source device based on the identification detection request;
   comparing the real-time proximity information with learned proximity information for the source device to obtain a comparison result; and
   in response to determining the comparison result indicates that the real-time proximity information matches the learned proximity information, receiving a screen projection request from the source device to perform screen projection;
   wherein
   the identification detection request includes a first signal strength value of the source device, and the real-time proximity information includes a first proximity signal strength value of the source device relative to the sink device and a first Media Access Control (MAC) address of the source device; and
   wherein the obtaining of the real-time proximity information comprises:
   obtaining a MAC address encapsulated by the source device into the identification detection request, as the first MAC address of the source device;
   obtaining a plurality of history first signal strength values from a plurality of history identification detection requests that are received, and calculating a first average value of the plurality of history first signal strength values;
   setting a signal strength value range based on the first average value; and
   obtaining a second average value of ones of the plurality of history first signal strength values within the signal strength value range, as the first proximity signal strength value.

2. The method of claim 1, further comprising:
   before the receiving of the identification detection request,
   receiving a learning detection request from the source device within the preset range of the sink device; and
   obtaining and storing the learned proximity information for the source device based on the learning detection request.

3. The method of claim 1, wherein,
   for each of the history identification detection requests, when it is determined that there are two signal strength values in the each of the history identification detection requests, a greater one of the two signal strength values is taken as one of the history first signal strength values corresponding to the each of the history identification detection requests.

4. The method of claim 1, wherein
   the identification detection request further comprises a first proximity information element of the source device;
   the method further comprises: after the receiving of the identification detection request,
   transmitting an identification detection response to the source device; and
   determining, based on the first proximity information element, whether the received identification detection request is marked; and
   in response to determining that the received identification detection request is marked, stopping transmission of the identification detection response to the source device.

5. The method of claim 1, wherein
   the learned proximity information includes a second proximity signal strength value of the source device relative to the sink device and a second MAC address of the source device;
   the comparing of the real-time proximity information with the learned proximity information comprises:
   determining whether the first proximity signal strength value is greater than the second proximity signal strength value and whether the first MAC address is consistent with the second MAC address; and one of:
   in response to determining that the first proximity signal strength value is greater than the second proximity signal strength value and the first MAC address is consistent with the second MAC address, obtaining the comparison result indicating that the real-time proximity information matches the learned proximity information; and
   in response to determining that the first proximity signal strength value is not greater than the second proximity signal strength value or the first MAC address is inconsistent with the second MAC address, obtaining the comparison result indicating that the real-time proximity information does not match the learned proximity information.

6. The method of claim 1, wherein
   the obtaining of the second average value as the first proximity signal strength value comprises:
   discarding ones of the history first signal strength values out of the signal strength value range to obtain rest of the history first signal strength values; and
   calculating the second average value of the rest of the history first signal strength values as the first proximity signal strength value.

7. The method of claim 1, further comprising
   one of:
   in response to determining the comparison result indicates that the real-time proximity information matches the learned proximity information, marking an identification detection response; and
   in response to determining the comparison result indicates that the real-time proximity information does not match the learned proximity information, stopping receiving of the identification detection request from the source device.

8. The method of claim 7, further comprising:
receiving a learning detection request from the source device within the preset range of the sink device; and
obtaining and storing the learned proximity information for the source device based on the learning detection request.

9. The method of claim 8, wherein
the obtaining and storing of the learned proximity information for the source device comprises:
obtaining a MAC address encapsulated by the source device into the learning detection request, as a second MAC address of the source device;
obtaining a plurality of second signal strength values from received history learning detection requests;
calculating a third average value of the plurality of second signal strength values;
setting a signal strength value range based on the third average value;
obtaining a fourth average value of ones of the plurality of second signal strength values within the signal strength value range, as a second proximity signal strength value of the source device relative to the sink device; and
storing the second MAC address and the second proximity signal strength value as the learned proximity information for the source device.

10. The method of claim 8, further comprising:
after the obtaining and storing of the learned proximity information,
marking a learning detection response;
determining, based on a second proximity information element of the learning detection request, whether the received learning detection request is marked; and
in response to determining that the received learning detection request is marked, stopping transmission of the learning detection response to the source device.

11. A sink device, comprising:
a processor; and
a memory storing a computer program executable by the processor to perform the screen projection method of claim 1.

12. A screen projection method applied to a source device, comprising:
in response to determining that the source device is within a preset range of a sink device, transmitting an identification detection request to the sink device, and receiving an identification detection response from the sink device;
obtaining real-time proximity information for the sink device based on the identification detection response;
comparing the real-time proximity information with learned proximity information for the sink device to obtain a comparison result; and
in response to determining the comparison result indicates that the real-time proximity information matches the learned proximity information, transmitting a screen projection request to the sink device to perform screen projection;
wherein the obtaining of the real-time proximity information comprises:
obtaining a MAC address encapsulated by the sink device into the identification detection response, as a third MAC address of the sink device;
obtaining a plurality of third signal strength values from received history identification detection responses, and calculating a fifth average value of the plurality of third signal strength values;
setting a signal strength value range based on to the fifth average value;
obtaining a sixth average value of ones of the plurality of third signal strength values within the signal strength value range, as a third proximity signal strength value of the sink device relative to the source device; and
taking the third MAC address and the third proximity signal strength value as the real-time proximity information for the sink device.

13. The method of claim 12, wherein
the transmitting of the screen projection request comprises:
continuing to receive the identification detection response to obtain a plurality of identification detection responses; and
in response to determining that a number of the identification detection responses reaches a preset number, marking the identification detection request, and transmitting the screen projection request to the sink device to perform the screen projection,
the method further comprises:
in response to determining the comparison result indicates that the real-time proximity information does not match the learned proximity information, stopping receiving of the identification detection response from the sink device.

14. The method of claim 12, wherein
the identification detection response comprises a third proximity information element of the sink device,
the method further comprises: after receiving the identification detection response,
determining, based on the third proximity information element, whether the received identification detection response is marked; and
in response to determining that the received identification detection response is marked, stopping transmission of the identification detection request to the sink device.

15. The method of claim 12, wherein
the comparing of the real-time proximity information with the learned proximity information comprises:
determining whether a third proximity signal strength value of the sink device relative to the source device included in the real-time proximity information is greater than a fourth proximity signal strength value of the sink device relative to the source device included in the learned proximity information and whether a third MAC address of the sink device included in the real-time proximity information is consistent with a fourth MAC address of the sink device included in the learned proximity information; and one of:
in response to determining that the third proximity signal strength value is greater than the fourth proximity signal strength value and the third MAC address is consistent with the fourth MAC address, obtaining the comparison result indicating that the real-time proximity information matches the learned proximity information; and
in response to determining that the third proximity signal strength value is not greater than the fourth proximity signal strength value or the third MAC address is inconsistent with the fourth MAC address, obtaining the comparison result indicating that the real-time proximity information does not match the learned proximity information.

16. The method of claim 12, further comprising:

in response to determining that the source device is within the preset range of the sink device, transmitting a learning detection request to the sink device, and receiving a learning detection response from the sink device; and obtaining and storing the learned proximity information for the sink device based on the learning detection response.

17. A source device, comprising:

a processor; and a memory storing a computer program executable by the processor to perform the screen projection method of claim 12.

18. A screen projection system, comprising a sink device and a source device, wherein the sink device is configured to perform operations comprising:

receiving an identification detection request from a source device within a preset range of the sink device;

obtaining real-time proximity information for the source device based on the identification detection request;

comparing the real-time proximity information with learned proximity information for the source device to obtain a comparison result; and in response to determining the comparison result indicates that the real-time proximity information matches the learned proximity information, receiving a screen projection request from the source device to perform screen projection;

wherein the identification detection request includes a first signal strength value of the source device, and the real-time proximity information includes a first proximity signal strength value of the source device relative to the sink device and a first Media Access Control (MAC) address of the source device; and wherein the obtaining of the real-time proximity information comprises:

obtaining a MAC address encapsulated by the source device into the identification detection request, as the first MAC address of the source device;

obtaining a plurality of history first signal strength values from a plurality of history identification detection requests that are received, and calculating a first average value of the plurality of history first signal strength values:

setting a signal strength value range based on the first average value; and obtaining a second average value of ones of the plurality of history first signal strength values within the signal strength value range, as the first proximity signal strength value; and the source device is configured to perform operations comprising:

in response to determining that the source device is within a preset range of a sink device, transmitting an identification detection request to the sink device, and receiving an identification detection response from the sink device;

obtaining real-time proximity information for the sink device based on the identification detection response;

comparing the real-time proximity information with learned proximity information for the sink device to obtain a comparison result; and in response to determining the comparison result indicates that the real-time proximity information matches the learned proximity information, transmitting a screen projection request to the sink device to perform screen projection.

* * * * *